(12) United States Patent
Li

(10) Patent No.: US 7,467,465 B2
(45) Date of Patent: Dec. 23, 2008

(54) FLEXIBLE PRODUCTION PROCESS FOR FABRICATING HEAT PIPES

(76) Inventor: Jia-Hao Li, No. 2, Lane 127, Dang Ke St., Kang Shan Jen, Kao Hsiung Hsien (TW)

( * ) Notice: Subject to any disclaimer, the term of this patent is extended or adjusted under 35 U.S.C. 154(b) by 746 days.

(21) Appl. No.: 10/984,437

(22) Filed: Nov. 10, 2004

(65) Prior Publication Data
US 2006/0096095 A1 May 11, 2006

(51) Int. Cl.
*B21D 53/06* (2006.01)
(52) U.S. Cl. .................. 29/890.032; 29/890.045; 29/890.053; 29/422; 29/722
(58) Field of Classification Search ............ 29/890.032, 29/890.045, 890.053, 422, 722
See application file for complete search history.

(56) References Cited

U.S. PATENT DOCUMENTS 4,880,052 A * 11/1989 Meyer et al. ............ 165/104.14
6,430,802 B1 * 8/2002 Miyajima ..................... 29/464

* cited by examiner

*Primary Examiner*—David P. Bryant
*Assistant Examiner*—Sarang Afzali

(57) ABSTRACT

A flexible production process for fabricating a heat pipe, having the processes of (a) performing pre-process on a heat-pipe material, (b) performing annealing process on the heat-pipe material, (c) introducing working fluid into the heat-pipe material, (d) removing non-condensable gas from the heat-pipe material, and (e) sealing the openings of the heat-pipe material. The heat-pipe material can be disposed into a laminar flow box between any of the steps (a) and (b), (b) and (c), and (c) and (d).

1 Claim, 2 Drawing Sheets

FLEXIBLE PRODUCTION PROCESS FOR FABRICATING HEAT PIPES

BACKGROUND OF THE INVENTION

The present invention relates in general to a flexible production process for fabricating a heat pipe, and more particularly, to a flexible production process that allows production of heat pipe to be resumed after temporary or over-night off of the production line.

In the typical fabrication process of heat pipes, processes such as cleaning, annealing, filling of working fluid, removal of non-condensable gas are required in a dust-proof chamber. Therefore, when the production line is temporary or overnight off, the heat pipes under process will not be exposed to air. Otherwise, the heat pipes have to be fabricated without interruption.

However, factors may affect the normal operation of the production line can hardly be controlled, dustproof rooms are typically built for heat-pipe manufactures. However, the dustproof rooms are very expensive, and it costs a lot to control the allowable members entering the dustproof rooms. Therefore, the cost of heat pipes cannot be reduced.

BRIEF SUMMARY OF THE INVENTION

To resolve the above drawbacks, a flexible production process for fabricating heat pipes is provided. Such process does not require a dustproof room, while the heat pipes are prevented from being contaminated by air due to temporary or overnight off of the machines. The fabrication can thus be resumed after the production line is open again.

Accordingly, the flexible production process for fabricating heat pipes includes the processes of (a) performing pre-process on a heat-pipe material, (b) performing annealing process on the heat-pipe material, (c) introducing working fluid into the heat-pipe material, (d) removing non-condensable gas from the heat-pipe material, and (e) sealing the openings of the heat-pipe material. The heat-pipe material can be disposed into a laminar flow box between any of the steps (a) and (b), (b) and (c), and (c) and (d).

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

Figure 1:
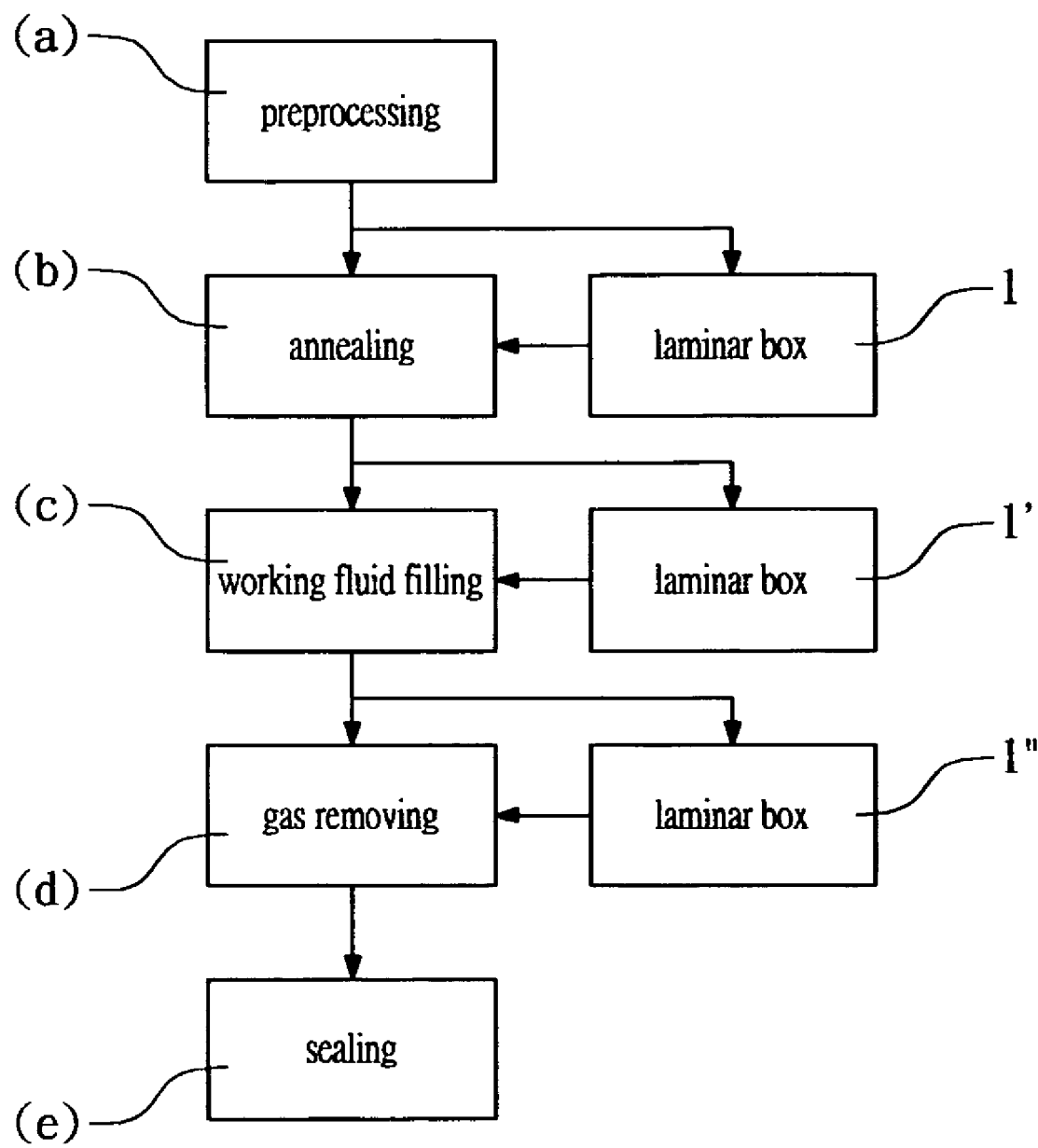
FIG. 1 shows a fabrication process of heat pipes.
Figure 2:
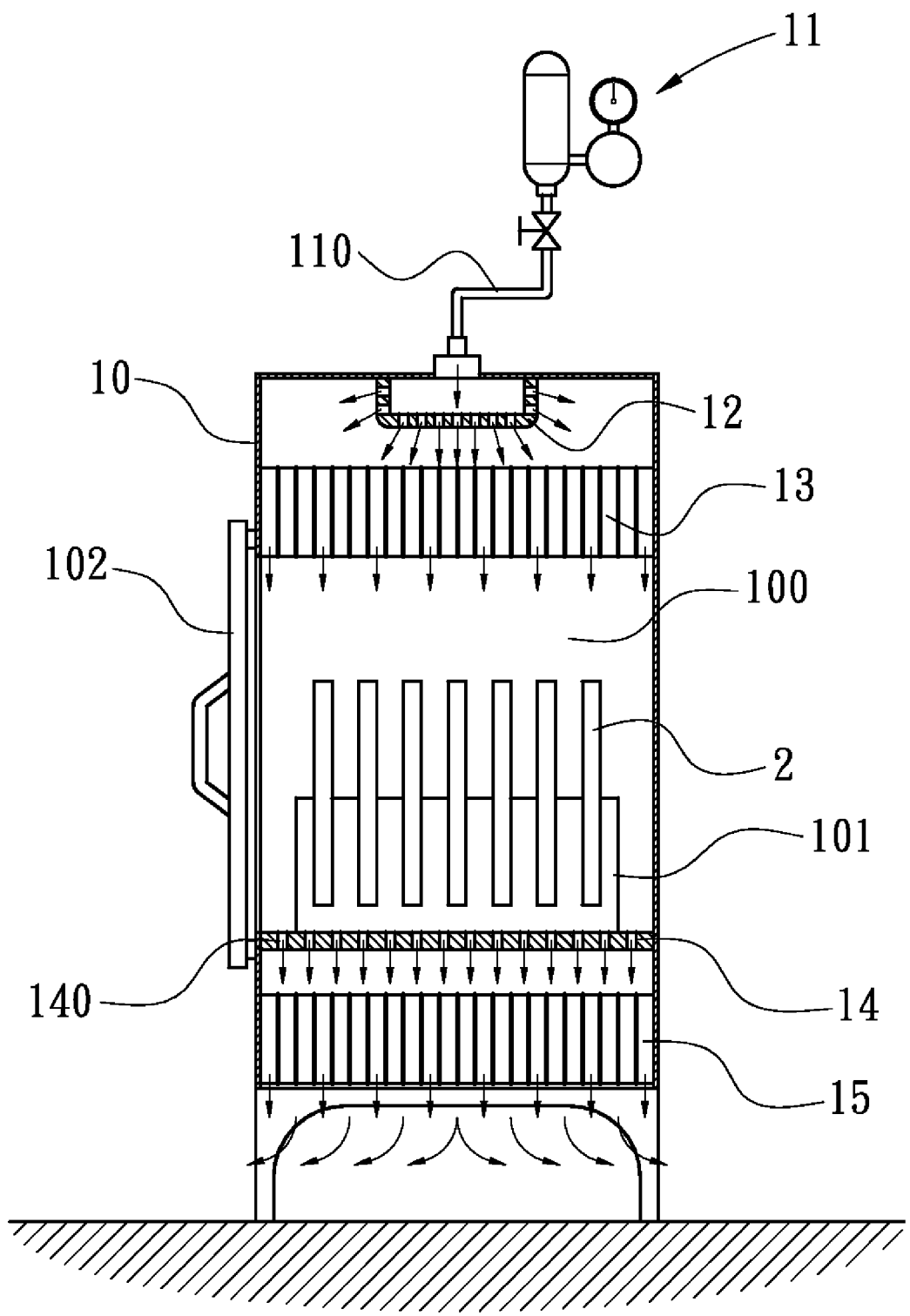
FIG. 2 shows the application status of a laminar box.

Referring to FIGS. 1 and 2, a flexible production process is provided to allow temporary or overnight off of a production line of heat pipes without the requirement of a dustproof room, while the heat pipes are prevented from being contaminated by air. In this process, laminar boxes 10 are adequately used in various stages 1, 1' and 1" during the fabrication steps of the heat pipes 2.

The production process (a) includes a pre-process, which perform pre-process on heat-pipe material, including checking whether the tubular material and the wick structure meets with the standard requirement, disposing the wick structure into the tubular material of the heat pipe, and cutting the tubular material into a desired length, and a cleaning the tubular material.

After the pre-process, an annealing process (b) is performed to the tubular material to suppress the stress in the tubular material, prevent the tubular material from being oxidized, and further clean the tubular material.

An adequate amount of working fluid is then introduced into the tubular material to work as a phase transition medium in step (c).

The non-condensable gas in the tubular material is then removed in step (d).

The openings of the tubular material are then sealed in step (e).

During the above process steps, for example, between steps (a) and (b), (b) and (c) or (c) and (d), the tubular materials are disposed in laminar box 10 as shown in FIG. 2. The laminar box 10 includes a hollow deposit chamber 100 and a deposit platform in the deposit chamber 100 allowing semi-products of the heat pipes 2 to be disposed therein. One side of the deposit chamber 100 includes a door panel 102 for accessing the heat pipes 2, and a gas supply 11 is installed on top of the laminar box 10. The gas supply 11 provides protection gas to protect the heat pipes 2 via the pipeline 110. A plurality of flow diffluent devices 12 installed at the top of the laminar box 10 is connected to the gas supply 11 to deliver the gas to a first fairing device 13 to direct the gas flowing vertically downward to the deposit chamber, such that the heat pipes 2 can be preserved in a clean air environment. Under the deposit platform 101 is a partitioning board 14. The partitioning board 14 includes a plurality of through holes 140 allowing the gas to flow through. The laminar box 10 further includes a second fairing device 15 to exhaust the air carrying impurity out of the chamber 100.

Accordingly, when the fabrication of the heat pipes 2 have to be interruption between steps (a) and (b), (b) and (c), or (c) and (d) due to unexpected condition, the heat pipes 2 can be stored or deposited in the laminar box 10. Thereby, the interruption of fabrication will not cause any contamination upon the heat pipes 2.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A flexible production process for fabricating heat pipes, comprising:
   (a) performing pre-process on tubular materials for making heat pipes;
   (b) performing annealing process on the tubular materials;
   (c) filling working fluid in the tubular materials;
   (d) removing non-condensable gas from the tubular materials; and
   (e) sealing openings of the tubular materials; wherein
   the tubular materials are disposed in a laminar box when the process is interrupted between steps of (a) and (b), (b) and (c), or (c) and (d) and
   the laminar box includes a hollow chamber, a platform disposed in the chamber for the tubular materials disposed thereon, a gas supply installed on top of laminar box to provide protection gas to protect the tubular materials, a plurality of flow diffluent devices installed at the top of the chamber to connect the gas supply to deliver the gas to a first fairing device and direct the gas flowing vertically downward in the chamber, a partitioning board with a plurality of through holes located under the platform allowing the gas to flow through, and a second fairing device to exhaust the gas carrying impurity out of the chamber, such that the tubular materials are preserved in a clean air environment.

* * * * *